(12) United States Patent
Parr

(10) Patent No.: US 8,092,866 B2
(45) Date of Patent: Jan. 10, 2012

(54) THERMOCHROMATIC PIGMENT COVERED ARTICLE AND METHOD OF MAKING THE SAME

(75) Inventor: Wayne Parr, North Covington, TN (US)

(73) Assignee: World Wide Lines, Inc., Covington, TN (US)

( * ) Notice: Subject to any disclaimer, the term of this patent is extended or adjusted under 35 U.S.C. 154(b) by 284 days.

(21) Appl. No.: 11/376,560

(22) Filed: Mar. 16, 2006

(65) Prior Publication Data

US 2006/0228498 A1 Oct. 12, 2006

Related U.S. Application Data

(60) Provisional application No. 60/663,738, filed on Mar. 22, 2005, provisional application No. 60/675,464, filed on Apr. 28, 2005.

(51) Int. Cl.
*B05D 3/02* (2006.01)

(52) U.S. Cl. .................. 427/384; 427/385.5; 427/421.1; 427/427.4; 427/430.1

(58) Field of Classification Search .................. 427/180, 427/372.2–397.7, 421.1, 427.4, 427.6, 427.7, 427/430.1

See application file for complete search history.

(56) References Cited

U.S. PATENT DOCUMENTS

| | | | |
|---|---|---|---|
| 4,156,365 A | 5/1979 | Heinmets et al. | |
| 4,421,560 A * | 12/1983 | Kito et al. | 106/31.2 |
| 4,425,161 A | 1/1984 | Shibahashi et al. | |
| 4,554,565 A | 11/1985 | Kito et al. | |
| 4,716,145 A | 12/1987 | Vanier et al. | |
| 4,725,462 A | 2/1988 | Kimura | |
| 4,853,256 A | 8/1989 | Obringer et al. | |
| 4,888,219 A | 12/1989 | Barnes | |
| 4,919,983 A | 4/1990 | Fremin | |
| 4,961,972 A * | 10/1990 | Shimizu et al. | 427/388.1 |
| 5,219,625 A | 6/1993 | Matsunami et al. | |
| 5,223,958 A | 6/1993 | Berry | |
| 5,489,567 A | 2/1996 | Koshizuka et al. | |
| 5,688,592 A | 11/1997 | Shibahashi et al. | |
| 5,809,590 A | 9/1998 | Williams et al. | |
| 5,820,951 A | 10/1998 | Osborne | |
| 5,997,849 A | 12/1999 | Small et al. | |
| 6,139,779 A | 10/2000 | Small et al. | |
| 6,261,348 B1 | 7/2001 | Kwan et al. | |
| 6,281,165 B1 | 8/2001 | Cranford | |
| 6,313,067 B1 * | 11/2001 | Maruyama | 503/227 |
| 6,478,861 B1 | 11/2002 | Kwan et al. | |
| 6,634,156 B1 | 10/2003 | Rutledge | |
| 6,669,765 B2 * | 12/2003 | Senga et al. | 106/31.16 |
| 6,759,099 B2 | 7/2004 | Lodge | |
| 6,902,775 B2 | 6/2005 | Lodge | |
| 6,946,168 B2 * | 9/2005 | Senga et al. | 428/1.1 |
| 2002/0107304 A1 * | 8/2002 | Leu et al. | 523/160 |
| 2004/0191524 A1 | 9/2004 | Lodge | |
| 2006/0172135 A1 * | 8/2006 | Agrawal et al. | 428/411.1 |
| 2007/0042175 A1 * | 2/2007 | Parr | 428/323 |

FOREIGN PATENT DOCUMENTS

| | | | |
|---|---|---|---|
| JP | 52-111787 | * | 9/1977 |
| WO | 98-57760 | | 12/1998 |

* cited by examiner

*Primary Examiner* — Erma Cameron
(74) *Attorney, Agent, or Firm* — Nixon & Vanderhye PC

(57) ABSTRACT

A thermochromatic pigment covered article, comprising a substrate, and a single layer of a combined encapsulated thermochromatic pigment and resin or resin mixture disposed on the substrate. In accordance with the method of the present invention, an encapsulated thermochromatic pigment mixture and a resin or resin mixture are combined and mixed so that the thermochromatic pigment is disbursed and protected in the resin to prevent it from separating therefrom, and the combined pigment mixture and resin or resin mixture are then applied to the substrate in a single layer.

14 Claims, No Drawings

THERMOCHROMATIC PIGMENT COVERED ARTICLE AND METHOD OF MAKING THE SAME

CROSS-REFERENCE TO RELATED APPLICATIONS

The present application is based on and claims the priority of Provisional Patent Application No. 60/663,738, filed on Mar. 22, 2005, and Provisional Patent Application No. 60/675,464, filed on Apr. 28, 2005.

FIELD OF THE INVENTION

The present invention relates to an improved thermochromatic pigment covered article and method of making the same. More particularly, the article is coated with a single layer of an encapsulated thermochromatic pigment that is contained within a resin in a manner that it does not separate therefrom.

BACKGROUND OF THE INVENTION

It is known to coat an article such as a mug, teapot or dish with thermochromatic ink such that, when the article undergoes a temperature change by, for example, hot liquid being poured therein, an image disposed on the article becomes visible as the thermochromatic ink becomes transparent, and when the article cools, the image "disappears". Also known are thermochromatic inks that change from opaque to transparent as the temperature changes from hot to cold. With such inks, images can be made to "disappear" when the article is heated.

In some cases, the coated article is covered with a pre-applied decoration that is covered by the thermochromatic ink coating. In other cases, the coating can be applied to an undecorated article and then a decoration can be sublimated into the coating.

U.S. Pat. No. 5,223,958 to Berry describes a well-known article that incorporates thermochromatic ink in an amusement device that is heat activated. Berry's amusement device comprises a supporting substrate, a layer of micro encapsulated thermochromatic liquid crystal material disposed on the substrate and an outer transparent film having a message or visual image. The requirement of a separate layer to carry the image, however, contributes to increased manufacturing costs in terms of both materials and process steps. Moreover, the Berry reference fails to provide any sort of protection for the transparent film. That is, the transparent film easily can be damaged by scratching or the like. Moreover still, an article manufactured in accordance with the disclosure of Berry is deficient in that no protection is afforded when the article is subjected to relatively harsh conditions, such as those presented by an automatic dishwasher.

U.S. Pat. No. 5,219,625 to Matsunami et al. is similar to Berry and discloses a thermochromatic laminate member having a base layer, a thermochromatic layer, and a thin transparent iridescent film laminated on the thermochromatic layer. Color patterns on the film become visible once the thermochromatic layer becomes clear after heating. An article fabricated in accordance with Matsunami et al., however, like an article made in accordance with Berry, requires a separate transparent film over the thermochromatic ink and, further, is susceptible to harsh conditions, wherein the laminate and even the thermochromatic ink layer can be damaged.

U.S. Pat. Nos. 6,759,099 and 6,902,775 to Lodge disclose decoration methods using thermochromic ink wherein a first coating having thermochromic ink is applied to an article to be decorated, the first coating is set or cured, and a second transparent coating material is applied over the first coating to protect it. This decoration method requiring multiple steps and two coatings is time consuming, complicated and thus expensive.

U.S. Pat. No. 6,281,165 to Cranford discloses a thermochromatic ink covered article and method making the same wherein a thermochromatic ink layer is disposed on the article, a protective coating is applied over the thermochromatic ink layer, and a design is disposed at least partially in the protective coating. This method is subject to the same disadvantages as the method disclosed in the Lodge patents in that it requires multiple manufacturing steps and two coatings to be applied to the article.

The thermochromatic pigment covered article and method of coating the same in accordance with the present invention are not subject to the disadvantages of the articles and methods disclosed in the above-identified patents, and embody improvements and advantages that are not disclosed or suggested by the above-identified patents or other prior art. More specifically, the present invention provides a thermochromatic pigment covered article and method wherein only a single coating is used that includes an encapsulated thermochromatic pigment contained within a resin in a manner that helps to protect the pigment and prevent the separation of the pigment and the resin.

SUMMARY OF THE INVENTION

In accordance with the present invention, a decorated or undecorated article such as a mug or the like is coated with a single layer of encapsulated thermochromatic pigment that is disposed in a resin and treated in a manner to protect it and prevent the separation of the pigment and the resin.

In the method of the present invention, a predetermined amount of encapsulated thermochromatic pigment in ink, powder or slurry form is first mixed together with a suitable wetting or dispersion agent that is compatible with the pigment so as not to break down its encapsulation. Mixing may be done by hand, mechanical mixer or in any other suitable manner. During the mixing process, a suitable solvent or solvents and a resin are added to the mixture to disburse or "wet out" and protect the pigment.

Depending on the nature of the resin and the wetting or dispersion agent, a suitable anti-sagging additive may be mixed therewith.

A suitable resin base mixture is then prepared The resin may be comprised of any single or combination of polyesters, acrylics, alkyds or epoxy resin. Also, the resin may be combined with a suitable durability additive and/or an anti-sagging additive which may include a surface tension additive.

Depending on the type of resin, a crosslinker mixture, which may comprise a catalyst, solvent and/or crosslinker is added to the resin base mixture, and these mixtures are further mixed by a mechanical mixer or any other suitable mixing device.

Depending on the substrate or article to be coated, a suitable surface tension additive may then be added to the final thermochromatic pigment mixture and resin base mixture after they are combined and mixed, and one or more solvents may be added to bring the combined mixtures to a desired viscosity for spraying or another application process. An adhesion promoter may then be added to the prepared combined mixture or may be pre-applied to the article to be coated.

The completed mixture may then be applied as a single layer thermochromatic coating on the substrate or article to be coated. The thermochromatic coating can be applied to the article by various methods, such as by spraying, a waterfall method or dipping. After the article is coated, the thermochromatic coating is cured in any suitable manner such as by heat, air drying or UV exposure. The curing method may vary depending on the type of resin and other ingredients included in the thermochromatic coating mixture.

If the coated article is undecorated, it may then be subjected to a sublimation process wherein a transfer that is printed with sublimation dyes is applied thereto with suitable heat and pressure to cause the sublimation dyes to vaporize and transfer into the single layer of thermochromatic coating. After cooling, the transferred image may then be obscured by the thermochromatic coating.

Also, in some cases where the coated article is not decorated or printed with sublimation dyes, it may be screen printed with a design or copy. It may also be screen printed in cases where it is decorated or printed with sublimation dyes.

DETAILED DESCRIPTION OF THE INVENTION

The present invention provides an improved thermochromatic pigment covered article and method of making the same. Specifically, in accordance with the present invention, there is provided an article such as a mug, glass or teapot that can withstand temperature changes and is capable of "hiding" a design or decoration within a thermochromatic material disposed on the article, and is capable of making the design or decoration appear when the article is subjected to increased temperature by, for example, a hot beverage being poured into it. Alternatively, the present invention provides such an article that is capable of showing a design or decoration at room temperature, but may hide the design or simply just change color when subjected to a cooler temperature by, for example, a cold beverage being poured therein.

It is to be understood that the present invention is applicable to any article that undergoes temperature changes and on which it might be desirable to place a design or decoration that appears or disappears or simply just changes color in accordance with changes in temperature.

In accordance with the present invention, a single layer of a coating containing an encapsulated thermochromatic pigment within a resin is applied to a decorated or undecorated article. If the article is undecorated, the single layer of the thermochromatic pigment and resin coating may then be subjected to a sublimation process wherein a transfer printed with sublimation dyes is applied to the coated article and exposed to suitable heat and pressure such that the sublimation dyes vaporize and transfer into the single layer of thermochromatic coating. Also, the coated article may be merely screen printed with a design or copy, whether decorated or undecorated.

In the new and improved method of the present invention, the thermochromatic pigment is mixed with a resin and other additives in a manner that ensures that the encapsulated thermochromatic pigment is protected, disbursed in the resin, and does not separate therefrom such that it can be applied as a single coating on the decorated or undecorated article to be coated.

According to the method of the present invention, a thermochromatic mixture is prepared by combining a suitable encapsulated thermochromatic pigment in ink, powder or slurry form with a suitable wetting or dispersion agent that is compatible therewith. Depending on the nature of the ingredients, the wetting or dispersion agent may be 1% to 100% by weight of the thermochromatic pigment.

As a specific example, the encapsulated thermochromatic pigment may be DYNA COLOR manufactured by Chromatic Technologies, Inc. or SAKURA COLOR-TC-PB45 manufactured by Sakura Color Products. The wetting or dispersion agent may be K-SPERSE 152 manufactured by King Industries.

A desired amount of a suitable resin is added to the pigment and wetting or dispersion agent mixture to "wet out" and disburse the encapsulated pigment. The resin can be comprised of any single or combination of polyesters, acrylics, alkyds or epoxy resin.

The thermochromatic pigment is mixed with the wetting or dispersion agent and the resin by hand, a mechanical mixer or in any other suitable manner for a period of time, e.g., 1-5 minutes, to effect adequate mixing of the components. While mixing, one or more suitable solvents may be added to the thermochromatic pigment mixture to vary the viscosity thereof. As illustrative examples, the solvents may be A100 manufactured by Sunoco, A150 manufactured by Eastman Chemical, or Toluene manufactured by ExxonMobil. The solvents may be added in an amount between 5%-40% by weight of the total thermochromatic pigment mixture.

Depending on the nature of the ingredients in the thermochromatic pigment mixture, a suitable anti-sagging additive may be mixed therewith in an amount from 5% to 70% by weight of the pigment. Examples of suitable anti-sagging additives are as follows:

| Name | Manufacturer |
| --- | --- |
| IRCOGEL | Lubrizol |
| K-STAY | King Industries |
| EZ GEL | Eagle Sales Company |

A resin base mixture is then prepared. The resin can be comprised of any single or combination of polyesters, acrylics, alkyds or epoxy resin. Depending on the nature of the resin, it may be mixed with a suitable durability additive and/or anti-sagging additive and, in some cases, a suitable surface tension additive. The components of the resin base mixture may be mixed by hand, with a mechanical mixer or in any other suitable manner for a suitable period of time and at a suitable temperature. As illustrative examples, the durability additive may be K-FLEX manufactured by King Industries, the anti-sagging additive may be CERATIX manufactured by BYK Cera BV or DISPARLON manufactured by King Industries, and the surface tension additive may be BYK361N, an acrylate copolymer manufactured by BYK Chemie. In the resin base mixture, the durability additive may be approximately 5 to 10% by weight of the resin, the anti-sagging additive may be approximately 0.5 to 5% by weight of the total mixture, and the surface tension additive may be approximately 0.05 to 0.5% by weight of the total mixture.

Depending on the type of resin and other ingredients, a crosslinker mixture, comprising a catalyst, solvent and/or crosslinker, may be added to the resin base mixture, before mixing with the thermochromatic pigment mixture. As an illustrative example, the catalyst may be a PTSA acid catalyst under the name CYCAT 4040 manufactured by Cytec, at a rate of between 0.5% to 3% by weight of the total resin and crosslinker solids. The solvent may be N-Butanol manufactured by Eastman Chemicals, at a rate of 40% to 60% by weight of the crosslinker, and the crosslinker may be CYMEL303, a modified melamine resin manufactured by Cytec, at a rate of between 20% to 45% by weight of the resin.

The crosslinker mixture and the resin base mixture are mixed in any suitable manner such as by mechanical mixing. Depending on the resin and other ingredients, a surface tension additive may then be added at a rate of approximately 0.05% to 0.5% by weight of the total mixture.

The thermochromatic pigment mixture and resin base and crosslinker mixture are then combined and mixed. Suitable solvents may then be added to the final thermochromatic pigment and resin base mixture to bring it to a desired viscosity for spraying or for another application process. For spraying, the viscosity may be between 25 and 40 seconds on a Zahm cup No. 2. The solvents may be the same as those used in the pigment and resin mixtures hereinbefore described.

Depending on the nature of the resin and substrate or article to be coated, a suitable adhesion promoter can be added to the total mixture in an amount of between 0.5% to 2% by weight of the total mixture. Alternatively, the adhesion promoter may be pre-applied to the substrate or article to be coated. The adhesion promoter may be a suitable type of Silane.

The completed mixture may then be used as a single layer thermochromatic coating to be applied to the substrate or article to be coated in any suitable manner such as by spraying, a waterfall method, dipping or in any other suitable manner. After the article is coated, a suitable curing method may be used depending on the type of resin or other components used. As illustrative examples, the coated substrate or article may be cured by heat, air or UV radiation for a suitable period of time.

Before the application of the single layer thermochromatic coating to a substrate or article, it should be cleaned in any suitable manner to free it of any dust or contamination.

If the coated substrate or article is not decorated, the decoration can be applied to the coating thereon by a sublimation process wherein a transfer printed with sublimation dyes is applied to the article and subjected to suitable heat and pressure for a suitable period of time to cause the sublimation dyes to vaporize and transfer into the single layer of thermochromatic coating, as described in the patent to Cranford, U.S. Pat. No. 6,281,165.

Because the encapsulated thermochromatic pigment is protected and contained within the resin mixture so that it does not separate therefrom, as a result of the new and improved method of the present invention, it is not necessary to apply a second protective coating to the combined thermochromatic pigment and resin mixture. Accordingly, decorated or undecorated articles can be effectively coated by a single layer thermochromatic coating in accordance with the present invention.

Specific examples of compositions and the method of the present invention are as follows:

Thermochromatic Pigment Mixture

In one illustrative example, approximately 12 to 36 g (preferably about 24 g) of K-Sperse 152, a wetting agent manufactured by King Industries is blended with approximately 500 to 700 g (preferably about 600 g) of an encapsulated thermochromatic pigment, e.g., DYNA COLOR 45° C., in powder form by hand or mechanical mixer. Depending on the type and nature of the thermochromatic pigment, the wetting agent may be approximately 0.5 to 8% of the pigment weight. While continuing the mixing, approximately 40 to 120 g (preferably about 60 g) of a solvent, such as A150 manufactured by Eastman Chemical is added to the thermochromatic pigment and wetting agent mixture. Depending on the nature and type of the thermochromatic pigment and the wetting agent, the solvent may be approximately 5 to 20% of the pigment weight.

While the mixing still continues, approximately 300 to 600 g (preferably 500 g) of a suitable resin, such as POLYMAC 2882 polyester resin manufactured by Resolution Specialty Materials, is added to the mixture and mixed well for approximately 5 minutes. Depending on the nature of the resin and the thermochromatic pigment and other ingredients, the resin may be 35 to 100% of the pigment weight.

Thereafter, the thermochromatic pigment mixture is run through a three roll mill or the like until the thermochromatic pigment powder is wet out thoroughly and the mixture has a glossy appearance. Approximately 2 to 15 passes through the roll mill may be necessary. The rollers should be maintained at a temperature below approximately 85% F to prevent damage to the pigment.

The completed thermochromatic pigment mixture is prepared in approximately 30 to 45 minutes using the above-described steps and can be stored in any suitable manner until it is ready for use.

Resin Base Mixture

The first part of the resin base mixture may comprise approximately 5500 to 5900 g (preferably about 5850 g) of POLYMAC 2882 polyester resin, 700 to 950 g (preferably about 900 g) of a suitable durability additive such as KFlex 188, manufactured by King Industries, and approximately 400 to 800 g (preferably about 600 g) of a suitable anti-sag agent such as DISPARLON 6900-20x, manufactured by King Industries. The resin, durability additive and anti-sag agent are mixed with a mechanical mixer for approximately 5 to 30 minutes until well blended without incorporating any air or a vortex.

Thereafter, while mixing continues, approximately 60 to 130 g (preferably about 100 g) of a surface tension defoamer, such BYK310 manufactured by BYK Chemie, is added and the mixing speed is increased until a vortex appears. Depending on the desired viscosity, one or more solvents may be added to the mixture while mixing continues. For example, 300 to 700 g (preferably about 500 g) of A150 solvent manufactured by Eastman Chemical and 300 to 700 g (preferably about 500 g) of A100 solvent manufactured by Sonoco may be added.

Finally, approximately 60 to 130 g (preferably about 100 g) of a bubble breaker or defoamer, surface tension and air release agent, such as BYK323 manufactured by BYK Chemie, is added to complete the first part of the base mixture.

Cross Linker Mixture

Depending on the nature of the resin (e.g., if a polyester resin is used), it may be necessary to add a cross linker mixture to the first part of the base mixture. If a cross linker mixture is necessary, one example would be to mix in a separate container approximately 1500 to 2100 g (preferably about 1960 g) of a stabilizer such as N-Butanol with approximately 40 to 120 g ((preferably about 60 g) of a catalyst such as CYCAT 4040 manufactured by Cytec, and approximately 2500 to 3800 g (preferably about 3500 g) of CYMEL 303, a crosslinker agent manufactured by Cytec. This cross linker mixture is mixed until it is well blended and clear for approximately 30 seconds to one minute. This cross linker mixture is then added to the completed first part of the base mixture while mixing continues.

Final Ingredients for Resin Base Mixture

The final ingredients for the resin base mixture comprise approximately 80 to 150 g (preferably about 130 g) of a leveling and surface tension agent such as BYK361N manufactured by BYK Chemie, approximately 200 to 400 g (preferably about 300 g) of an adhesion promoter such SILANE manufactured by Advanced Polymer, Inc. approximately 1500 to 2500 g (preferably about 2400 g) of a suitable solvent such as TOLUENE manufactured by ExxonMobil and approximately 800 to 1600 g (preferably about 1400 g) of a slow solvent such as DB ACETATE manufactured by Eastman Chemical for suitable spraying viscosity. These final ingredients are added to the first part of the base mixture and the cross linker mixture while they continue to be mixed together.

Final Mixture

Approximately 400 to 700 g (preferably about 630 g) of the thermochromatic pigment mixture are mixed with approximately 75 to 150 g (preferably about 100 g) of a thermal anti-sag additive such as K-STAY 501 manufactured by King Industries. They are mixed with a mechanical mixer or the like until well blended.

Thereafter, approximately 100 to 200 g (preferably about 120 g) of a suitable solvent such as a A-150 manufactured by Eastman Chemical and 100 to 200 g (preferably about 160 g) of another suitable solvent such as TOLUENE manufactured by ExxonMobil are added to the thermochromatic pigment mixture while mixing continues.

Approximately 1500 to 1900 g (preferably about 1800 g) of the combined base mixture and cross linker mixture are then added and mixed with the thermochromatic pigment mixture until well blended. Finally, a slow solvent such as DB Acetate in the amount of approximately 100 to 200 g (preferably about 160 g) may be added to the final mixture for a desired viscosity.

Other additives may be used as needed or desired, and other pigments may be added for different visual effects.

It is noted that the above-described specific composition and method is only one example of a completed mixture that may be used as a single layer thermochromatic coating with use of a specific resin and other ingredients. The ingredients may vary significantly depending on the type of encapsulated pigment, the type of resin, the type of wetting agent and other ingredients to be used.

Also, in a modified embodiment, the thermochromatic pigment mixture and resin base mixture may be mixed together before the crosslinker mixture and other ingredients are added thereto and mixed therewith.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

TECHNICAL DESCRIPTION OF PRODUCTS IDENTIFIED BY TRADEMARKS

| TRADE-MARK | MANU-FACTURER | PURPOSE | COMPOSITION |
|---|---|---|---|
| DYNA COLOR | Chromatic Technologies, Inc. | Thermochromic polymer dispersion | formaldehyde, diethylene glycol monobutyl ether, zinc alkyllarysulfonate, n-butyl acetate |
| SAKURA COLOR TC | Sakura Color Products Corp. | Thermochromic pigment | proprietary dry thermochromic pigment |
| NC BASE | Matsui Shikiso Chemical Co., Ltd. | Thermochromic pigment | acrylic resin, methylcyclohexane, xylenes, η-heptane, thermochromic microcapsule, formaldehyde |
| K-SPERSE 152 | King Industries, Inc. | Dispersing and wetting agent | zinc alkylarylsulfonate, ethylene glycol monobutyl ether |
| A100 | Sunoco, Inc. | Solvent | light aromatic solvent naphtha, 1,2,4-trimethylbenzene, 1,3,5-trimethylbenzene, n-propyl benzene, cumene, xylene |
| A150 | ExxonMobil Chemical Company | Solvent | petroleum hydrocarbons naphthalene, trimethylbenzene |
| IRCOGEL | Lubrizol | Anti-sagging additive | calcium sulfonate petroleum naphtha, 1,2,4-trimethylbenzene 1,3,5-trimethylbenzene, 1,2,3-trimethylbenzene propylbenzene |
| K-STAY | King Industries, Inc. | Anti-sagging additive | metal sulfonate, light aromatic naphtha (may contain 1,2,4-trimethylbenzene, xylene, cumene) |
| EZ GEL | Eagle Sales Company | Anti-sagging additive | alkyl quaternary bentonite aromatic 100 cumene xylene pseudocumene |
| K-FLEX 188 | King Industries, Inc. | Durability additive | Polyester polyol |
| CERATIX | BYK-Cera BV | Anti-sagging additive | n-butyl acetate, xylene, butan-1-ol ethylbenzene |
| DISPARLON | King Industries, Inc. | Anti-sagging additive | ethylbenzene m-xylene o-xylene p-xylene ethanol, methanol |
| BYK-361 N | BYK-Chemie USA Inc. | Surface tension additive | acrylate copolymer, xylene |
| CYCAT 4040 | CYTEC Industries, Inc. | Catalyst | toluenesulfonic acid, isopropanol |
| CYMEL 303 | CYTEC Industries, Inc. | Cross linker | methylated melamine-formaldehyde resin |
| POLYMAC 2882 | Resolution Specialty Materials LLC | Polyester resin | proprietary polymer, n-butyl acetate |
| BYK-310 | BYK-Chemie USA Inc. | Surface tension defoamer | xylene, ethylbenzene, siloxanes & silicones, dimethyl, 3-hydroxypropyl group-terminated, diesters with poly(2-oxepanone), diacetates |
| BYK-323 | BYK-Chemie USA Inc. | Surface tension and air release agent | polyalkylaryl siloxane |
| DB ACETATE | Eastman Chemical Company | Solvent | diethylene glycol monobutyl ether acetate |

What is claimed is:

1. A method of manufacturing a thermochromatic pigment covered article, comprising:

mixing an encapsulated thermochromatic pigment with a wetting or dispersion agent and a first resin to form a pigment mixture;

adding an anti-sag additive and/or a solvent to the pigment mixture and mixing them together;

preparing a resin base mixture comprising a mixture of the first resin and a second resin that is different from the first resin, a durability additive and/or anti-sag additive, and a crosslinker mixture;

adding the resin base mixture to the pigment mixture and mixing them together so that the thermochromatic pigment is dispersed therein and protected and to prevent the thermochromatic pigment from separating from the first resin and to keep it dispersed therein; and applying the combined pigment mixture and resin base mixture to an article in a single layer by spraying, a waterfall method or dipping.

2. The method of claim 1 further comprising curing the single layer of the pigment mixture and resin base mixture on the article.

3. The method of claim 1 wherein the article is decorated before the single layer of the pigment mixture and resin base mixture is applied thereto.

4. The method of claim 1 wherein the article is undecorated when the single layer of the pigment mixture and resin base mixture is applied thereto, and further comprising applying a decoration by sublimation into the single layer after the single layer is applied to the article.

5. The method of claim 1 wherein said pigment mixture is prepared by combining and mixing an encapsulated thermochromatic ink, powder or slurry with the wetting or dispersion agent and the first resin.

6. The method of claim 1 wherein the first resin and second resin are selected from the group consisting of one or more of a polyester, an acrylic, or epoxy resin.

7. The method of claim 6 wherein the first resin is a polyester and the second resin is an acrylic and/or epoxy.

8. The method of claim 1 wherein said crosslinker mixture comprises a catalyst, a solvent and a crosslinker agent.

9. The method of claim 1 further comprising adding a surface tension additive to the resin base mixture before it is added to the pigment mixture, said surface tension additive being different from said wetting or dispersion agent.

10. The method of claim 1 wherein a solvent is added to the combined pigment mixture and resin base mixture before they are applied as a single layer to the article.

11. The method of claim 1 wherein an adhesion promoter is added to the combined pigment mixture and resin base mixture before they are applied as a single layer to the article.

12. The method of claim 1 wherein the resin base mixture further comprises a surface tension defoamer and a second solvent.

13. The method of claim 1 wherein the resin base mixture further comprises an adhesion promoter.

14. The method of claim 13 wherein the adhesion promoter is SILANE.

* * * * *